(12) United States Patent
Chou et al.

(10) Patent No.: US 7,265,967 B2
(45) Date of Patent: Sep. 4, 2007

(54) HOUSING FOR MONITOR

(75) Inventors: Miao-Tzu Chou, Taipei (TW);
Chia-Yen Hsu, Taipei (TW);
Chia-Shiang Pan, Taipei (TW)

(73) Assignee: Datavan International Corp., Taipei Hsien (TW)

( * ) Notice: Subject to any disclaimer, the term of this patent is extended or adjusted under 35 U.S.C. 154(b) by 359 days.

(21) Appl. No.: 10/907,865

(22) Filed: Apr. 19, 2005

(65) Prior Publication Data

US 2006/0232916 A1 Oct. 19, 2006

(51) Int. Cl.
*H05K 5/00* (2006.01)
(52) U.S. Cl. ............ 361/679; 455/575; 320/104; 429/176
(58) Field of Classification Search .......... 700/94; 455/575.1, 572; 429/50, 176; 340/575, 340/576; 320/815.5, 104, 115; 361/679–687, 361/724–727
See application file for complete search history.

(56) References Cited

U.S. PATENT DOCUMENTS

| 5,825,616 | A | * | 10/1998 | Howell et al. | ............ 361/684 |
| 6,878,872 | B2 | * | 4/2005 | Lloyd et al. | ............ 174/384 |
| 7,167,358 | B2 | * | 1/2007 | Iwasaki et al. | ........... 361/683 |
| 2006/0161281 | A1 | * | 7/2006 | Lian et al. | ................ 700/94 |

* cited by examiner

*Primary Examiner*—Hung Van Duong

(57) ABSTRACT

A housing for monitor is disclosed to have a plurality of open chambers at the back side in communication with the inside space thereof for accommodating a respective electronic device of the electric module mounted in the inside space, and a cover fastened to the back side for covering the open chambers respectively for allowing quick performance of the repair or replacement of the electronic devices accommodated in the open chamber without dismounting the housing.

14 Claims, 3 Drawing Sheets

HOUSING FOR MONITOR

BACKGROUND OF THE INVENTION

1. Field of the Invention

The present invention relates to a monitor and more particularly, to a housing for monitor, which allows performance of the repair or replacement of major electronic devices of the housed electric module conveniently.

2. Description of the Related Art

Following fast development of high technology, computer and its related products have become requite items in daily life of most people. The application of network communication technology gives people a totally new living, learning, working and entertainment environment. Following the progress of the society and the development of information industry, people can use network communication systems to send real-time information, advertising matter, or e-mails. We can also use the Internet to search desired information, to have a chat with other people at different remote places, play network games, and etc. A monitor is commonly used as a communication interface between a computer and its user. From early CRT (cathode ray tube) monitors to current LCD monitors, it is the market trend to provide monitors having light and thin characteristics. A monitor uses a housing formed of a front cover shell and a back cover shell to house a display panel and electronic component parts such as IC, microprocessor, and etc., and a light source and a transformer are installed in the border area of the housing for giving off light. The light source or transformer of a monitor or touch screen display made according to this design may attenuate quickly with use, and the IC or microprocessor of this design of monitor or touch screen display may damage easily after a long use. When wishing to replace damaged parts or upgrade the hardware, it is necessary to open the housing of the monitor or touch screen display by unfastening the front cover shell from the back cover shell, and then to remove the component parts of the monitor or touch screen display one after another in proper order. After installation of the new electric module, the monitor or touch screen display is assembled again. This dismounting/mounting procedure is complicated. In case a small screw or part is damaged or missed during dismounting/mounting procedure, the assembly process of the monitor or touch screen display may fail, or the monitor or touch screen display may be unable to function well.

Therefore, it is desirable to provide a monitor that eliminates the aforesaid drawbacks.

SUMMARY OF THE INVENTION

The present invention has been accomplished under the circumstances in view. It is therefore the main object of the present invention to provide a housing for monitor, which allows performance of the repair or replacement of major electronic devices of the housed electric module conveniently. To achieve this and other objects of the present invention, the housing comprises a plurality of open chambers at the back side in communication with the inside space thereof for accommodating a respective electronic device of the electric module mounted in the inside space, and a cover fastened to the back side for covering the open chambers respectively for allowing quick performance of the repair or replacement of the electronic devices accommodated in the open chamber without dismounting the housing.

DETAILED DESCRIPTION OF THE PREFERRED EMBODIMENT

Figure 1:
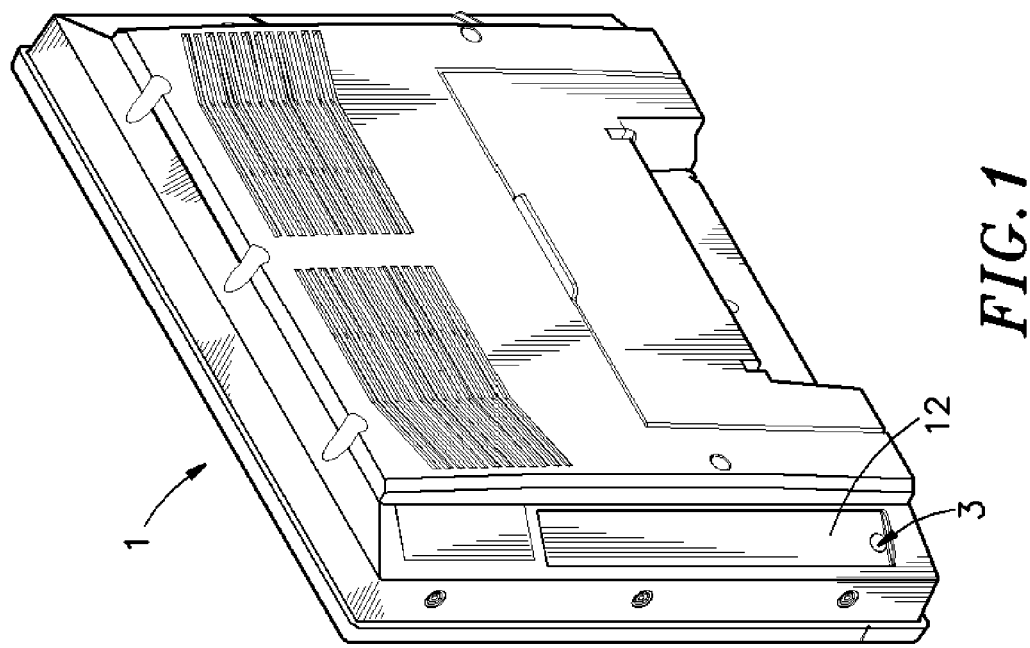
FIG. 1 illustrates the outer appearance of a housing for monitor according to the present invention.
Figure 2:
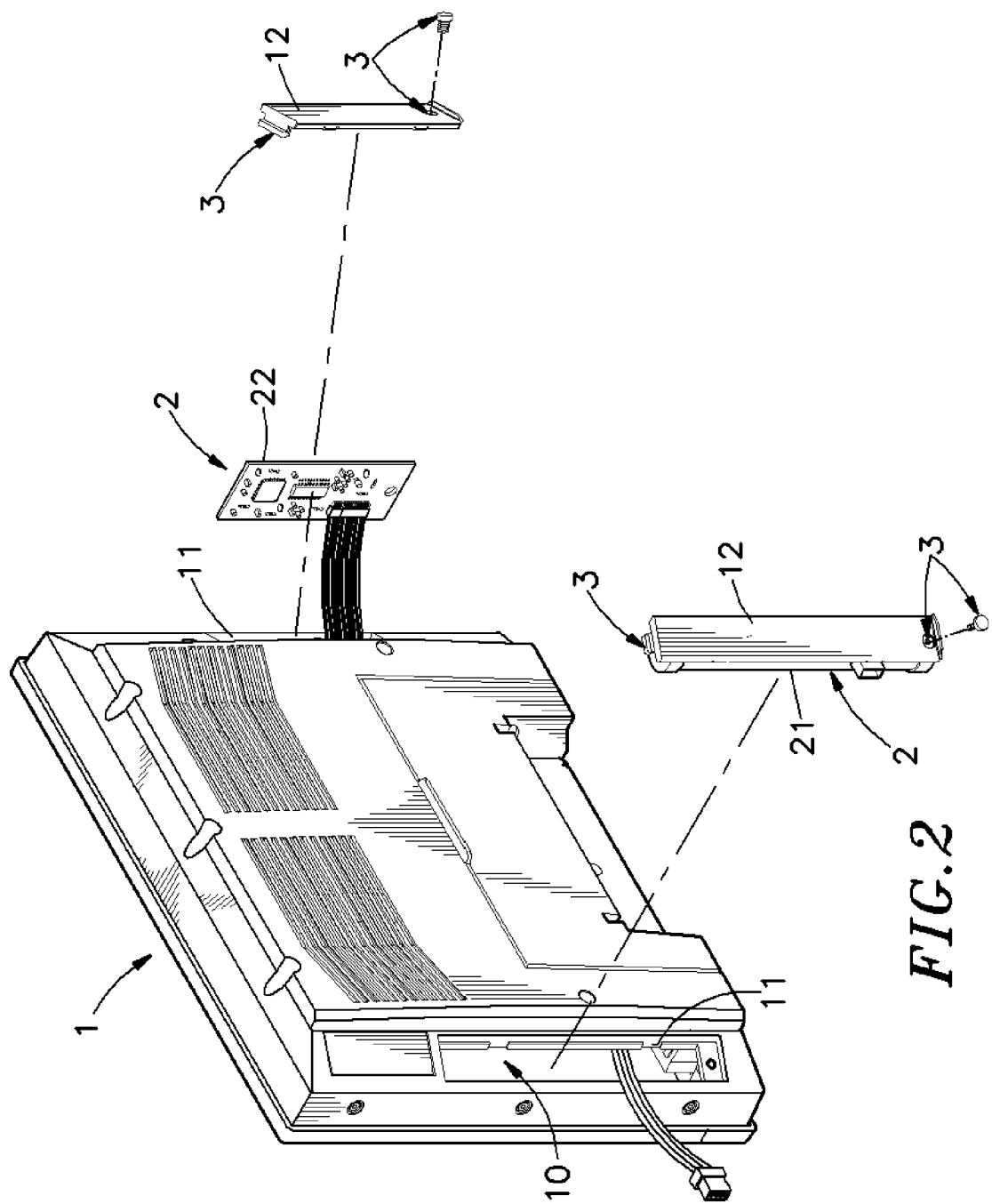
FIG. 2 is an exploded view of the housing for monitor according to the present invention.

Referring to FIGS. 1 and 2, a housing 1 for monitor in accordance with the present invention is shown having an inside space 10 for accommodating an electric module (not shown).

The housing 1 has at least one open chamber 11 at the back side in communication with the inside space 10 for accommodating a respective electronic device 2 of the electric module mounted in the inside space 10 that has a relatively shorter service life in comparison to other electronic devices of the electric module. The electronic device 2 can be the boosting transformer 21, control board 22 with an IC or microprocessor. Further, each open chamber 11 is covered with a respective cover 12, which is fastened to the back side of the housing 1 with connecting means 3. Simply by detaching the cover 12 from the housing 1, the engineer can repair or replace the electronic device 2 conveniently without dismounting the housing 1. Further, the housing 1 can be designed for a desktop LCD monitor or touch screen display. The connecting means 3 can be a screw, hook joint, plug joint, or any of a variety of other suitable devices or joints.

Figure 3:
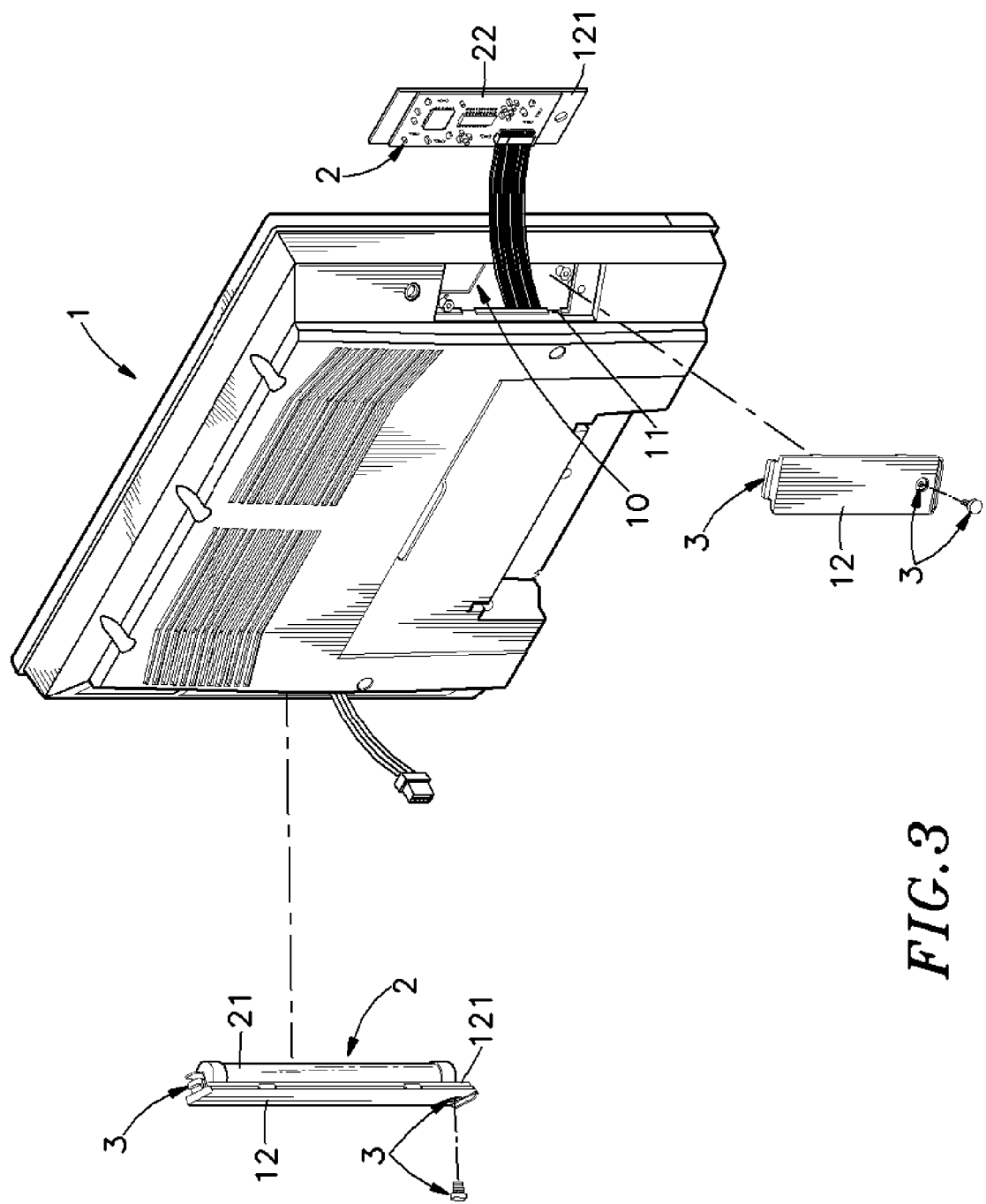
FIG. 3 is an exploded view of an alternate form of the present invention.

FIG. 3 shows an alternate form of the present invention. According to this embodiment, a mounting plate 121 is mounted inside the open chamber 11 to hold one electronic device 2 in the open chamber 11. The mounting plate 121 is affixed to the inside of the open chamber 11 by connecting means 3, which can be a screw, hook joint, plug joint, or any of a variety of other suitable devices or joints. The cover 12 for covering the open chamber 11 is pivotally connected to the mounting plate 121. The mounting plate 121 is metal frame member that provides a protection against EMI (electromagnetic interference). When wishing to replace or repair the electronic device 2, open the cover 12, then unfasten the connecting means 3, and then remove the mounting plate 121 and the electronic device 2 from the open chamber 11.

As indicated above, the present invention provides a housing 1 for monitor, which has open chambers 11 provided at the back side and covered with a respective cover 12 for accommodating a respective electronic device 2 of the electric module mounted in the inside space 10 of the housing 1 such that a replacement or maintenance work of the electronic devices 2 can easily be performed without detaching the housing 1. Further, a metal mounting frame 121 may be mounted in each open chamber 11 to hold the respective electronic device 2 for EMI protection.

A prototype of housing for monitor has been constructed with the features of FIGS. 1~3. The housing for monitor functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A housing having an inside space thereof for accommodating an electric module carrying a plurality of electronic devices, wherein the housing comprises at least one open chamber disposed at a back side thereof in communication with said inside space for accommodating a respective electronic device of the electric module mounted in said inside space, at least one cover for covering said at least one open chamber respectively, and connecting means that secure said at least one cover to the back side of said housing corresponding to said at least one open chamber.

2. The housing as claimed in claim 1, wherein said at least one open chamber includes one open chamber adapted to accommodate a boosting transformer.

3. The housing as claimed in claim 1, wherein said at least one open chamber includes one open chamber adapted to accommodate a control board, which comprises an IC.

4. The housing as claimed in claim 1, wherein said at least one open chamber includes one open chamber adapted to accommodate a control board, which comprises microprocessor.

5. The housing as claimed in claim 1, wherein said connecting means comprises at least one screw.

6. The housing as claimed in claim 1, wherein said connecting means is a hook joint.

7. The housing as claimed in claim 1, wherein said connecting means is a plug joint.

8. A housing having an inside space thereof for accommodating an electric module carrying a plurality of electronic devices, wherein the housing comprises at least one open chamber disposed at a back side thereof in communication with said inside space, at least one metal mounting plate respectively mounted inside said at least one open chamber for holding a respective electronic device of the electric module mounted in said inside space, at least one cover respectively connected to said at least one metal mounting plate for covering said at least one open chamber, and connecting means that secure said at least one metal mounting plate to said housing inside said at least one open chamber.

9. The housing as claimed in claim 8, wherein said at least one open chamber includes one open chamber adapted to accommodate a boosting transformer.

10. The housing as claimed in claim 8, wherein said at least one open chamber includes one open chamber adapted to accommodate a control board, which comprises an IC.

11. The housing as claimed in claim 8, wherein said at least one open chamber includes one open chamber adapted to accommodate a control board, which comprises microprocessor.

12. The housing as claimed in claim 8, wherein said connecting means comprises at least one screw.

13. The housing as claimed in claim 8, wherein said connecting means is a hook joint.

14. The housing as claimed in claim 8, wherein said connecting means is a plug joint.

* * * * *